(12) United States Patent
Keski-Kujala et al.

(10) Patent No.: US 11,183,836 B2
(45) Date of Patent: Nov. 23, 2021

(54) SAFETY DESIGN FOR DC LINK CAPACITORS

(71) Applicant: Vacon Oy, Vaasa (FI)

(72) Inventors: Tommi Keski-Kujala, Vaasa (FI); Ari Ristimäki, Laihia (FI); Pekka Hemminki, Laihia (FI); Jani Matti Perkiö, Tampere (FI)

(73) Assignee: Vacon Oy, Vaasa (FI)

( * ) Notice: Subject to any disclaimer, the term of this patent is extended or adjusted under 35 U.S.C. 154(b) by 63 days.

(21) Appl. No.: 16/424,980

(22) Filed: May 29, 2019

(65) Prior Publication Data

US 2019/0386576 A1    Dec. 19, 2019

(30) Foreign Application Priority Data

Jun. 19, 2018    (DE) .................. 102018114641.8

(51) Int. Cl.
| | | |
|---|---|---|
| *H02H 7/16* | (2006.01) | |
| *H02H 3/02* | (2006.01) | |
| *H02H 3/28* | (2006.01) | |
| *H02M 1/32* | (2007.01) | |

(52) U.S. Cl.
CPC ............ *H02H 7/16* (2013.01); *H02H 3/023* (2013.01); *H02H 3/28* (2013.01); *H02M 1/32* (2013.01)

(58) Field of Classification Search
CPC .... H02M 1/32; H02M 2001/322; H02H 3/28; H02H 3/023; H02H 7/16; H02H 3/26
See application file for complete search history.

(56) References Cited

U.S. PATENT DOCUMENTS

| | | | | |
|---|---|---|---|---|
| 9,907,172 | B2 * | 2/2018 | Berry .................. | H05K 1/0293 |
| 9,998,060 | B2 * | 6/2018 | Tao ........................ | H02M 1/32 |
| 2014/0085835 | A1 * | 3/2014 | Berry ...................... | H05K 1/18 |
| | | | | 361/748 |
| 2015/0098258 | A1 | 4/2015 | Park et al. | |
| 2019/0245474 | A1 * | 8/2019 | Gotou .................. | H02P 29/024 |
| 2019/0260300 | A1 * | 8/2019 | Horikoshi ............... | H02M 7/48 |
| 2019/0372504 | A1 * | 12/2019 | Satou ...................... | H02P 27/06 |

FOREIGN PATENT DOCUMENTS

| | | | | |
|---|---|---|---|---|
| GB | 2512632 | A * | 10/2014 | ............. H02H 3/023 |
| JP | 2012075263 | A | 4/2012 | |
| JP | 5415387 | B2 | 2/2014 | |

\* cited by examiner

*Primary Examiner* — Rafael O De Leon Domenech
(74) *Attorney, Agent, or Firm* — McCormick, Paulding & Huber PLLC

(57) ABSTRACT

An electronic circuit includes: a first series-connection of DC link capacitors ($C_{A1}, \ldots, C_{Am}$) and a second series-connection of DC link capacitors ($C_{B1}, \ldots, C_{Bn}$) connected in parallel between DC bus bars (DC+, DC−), wherein the first series has a first node (A) between the DC link capacitors thereof and the second series has a second node (B) between the DC link capacitors thereof; and a short-circuit module (301; 401, 407) configured to receive a voltage difference (UM) between the first node and the second node and to cause the DC bus bars short circuited in response to the received voltage difference being greater than a predetermined threshold.

14 Claims, 4 Drawing Sheets

SAFETY DESIGN FOR DC LINK CAPACITORS

CROSS-REFERENCE TO RELATED APPLICATION

This application claims foreign priority benefits under U.S.C. § 119 to German Patent Application No. 102018114641.8 filed on Jun. 19, 2018, the content of which is hereby incorporated by reference in its entirety.

TECHNICAL FIELD

The present disclosure relates generally to safety design for electronic circuits, and more particularly to circuits including DC link capacitors with improved safety.

BACKGROUND

DC link capacitors generally assume electrolytic capacitors in series between DC bus bars. However, the electrolytic capacitors in series have a problem that one capacitor from the series might break down if another one from the series is shorted, intentionally (during, for example, UL tests) or unintentionally (due to, for example, malfunctions). This may result in explosions and/or ground faults.

Therefore, an unaddressed need exists in the art to address the aforementioned deficiencies and inadequacies.

SUMMARY

In one aspect, the disclosure is directed to an electronic circuit, including: a first series-connection of DC link capacitors and a second series-connection of DC link capacitors connected in parallel between DC bus bars, wherein the first series has a first node between the DC link capacitors thereof and the second series has a second node between the DC link capacitors thereof; and a short-circuit module configured to receive a voltage difference between the first node and the second node and to cause the DC bus bars short circuited in response to a change in the received voltage difference being greater than a predetermined threshold.

Each of the DC link capacitors has a voltage thereon according to voltage division among those capacitors based on their respective capacitance values. As a result, for two determined nodes between those capacitors, e.g., the first node and the second node, the voltage difference therebetween can be determined based on only the capacitor values of the capacitors. This voltage difference will keep substantially constant while all the capacitors are working normally (i.e., a normal state).

According to embodiments, a malfunction state, e.g., short-circuiting, of one or more from the DC link capacitors will change the voltage division among the capacitors and thus cause change in the voltage difference between the first node and the second node, triggering the short-circuit module. As a result, the DC bus bars will be shorted by the short-circuit module, which helps burn fuses before, for example, capacitor explosions and ground faults.

The threshold can be designed so that it is less than the change of the voltage difference in the malfunction state as compared to that in the normal state, but still accommodates general fluctuations of the electronic circuits.

In certain embodiments, the first node and the second node have substantially the same voltage in a normal state of the DC link capacitors. In this case, the voltage difference can be handled as the change of the voltage difference, and thus it is relatively easy to monitor the change in the voltage difference between the first node and the second node by simply monitoring the voltage between the first node and the second node.

In certain embodiments, the short-circuit module includes an arc-generating component, which is arranged adjacent to the DC bus bars and operable to generate an electric arc in response to the change in the received voltage difference being greater than the predetermined threshold. The arc-generating component can be disposed closely to the DC bus bars so that the generated electric arc can cause the DC bus bars short-circuited. The arc-generating component is for example arranged in a distance of less than 10 cm from the DC bus bars.

In certain embodiments, the arc-generating component is operable to blow up when the received the voltage difference is greater than the predetermined threshold. Therefore, the arc-generating component can go into a "stiff" short-circuit state and thus ignite the arc.

In certain embodiments, the arc-generating component includes at least one of a Transient Voltage Suppressor (TVS) diode, a Zener diode, a resistor, a varistor, an active component, a SIDACtor, a fuse, a copper trace or wire, or any combination thereof. For example, the active component includes a semiconductor switch.

In certain embodiments, at least portions of the respective DC bus bars are arranged to be close to each other and the arc-generating component is arranged between the respective portions of the DC bus bars. Such a close arrangement facilitates the DC bus bars to be shorted by the arc generated by the arc-generating component. For example, the arc-generating component can be arranged to face the respective DC bus bars so that the generated arc can pass through a space between the DC bus bars.

In certain embodiments, the respective portions of the DC bus bars include electrode tabs led from the respective DC bus bars. Therefore, the DC bus bars can have enlarged portions. Those enlarged portions facilitate short-circuiting between the DC bus bars by the arc.

In certain embodiments, the short-circuit module includes a switch connected between the DC bus bars and configured to be switched on to short-circuit the DC bus bars in response to the change in the received voltage difference being greater than the predetermined threshold. In certain embodiments, the switch includes an electrical switch or a mechanical switch. In certain embodiments, the switch is configured to be switched off in response to loss of the received voltage difference. Due to the switch, the DC bus bars are hard wired and thus shorted.

In certain embodiments, the electronic circuit further includes over-current protection means to cut the circuit in response to an over-current due to the short-circuit state. In certain embodiments, the electronic circuit further includes fuses connected in the DC bus bars and configured to be burnt when the DC bus bars are short circuited. In certain embodiments, the circuit further includes fuses connected in AC lines, from which a DC voltage is converted and then delivered on the DC bus bars, wherein the fuses are configured to be burnt when the DC bus bars are short circuited. The fuses help cut the DC bus bars from power supply to avoid possible damages.

In another aspect, the present disclosure relates to a device including the electronic circuit as described above. The device can be a frequency converter, a motor drive, or the like.

In another aspect, the present disclosure relates to a method of operating an electronic circuit, the electronic circuit comprising a first series-connection of DC link capacitors and a second series-connection of DC link capacitors connected in parallel between DC bus bars (DC+, DC−). The method includes: monitoring a voltage difference between a first node between the DC link capacitors of the first series and a second node between the DC link capacitors of the second series, wherein the first node and the second node are selected so that they have substantially the same voltage in a normal state of the DC link capacitors; and short-circuiting the DC bus bars in response to the monitored voltage difference being greater than a predetermined threshold.

In another aspect, the present disclosure relates to a frequency converter, comprising: DC bus bars configured to deliver DC power; a first series-connection of DC link capacitors and a second series-connection of DC link capacitors connected in parallel between DC bus bars, wherein the first series has a first node between the DC link capacitors thereof and the second series has a second node between the DC link capacitors thereof, wherein the first node and the second node have substantially the same voltage in a normal state of the DC link capacitors; and a short-circuit module configured to receive a voltage difference between the first node and the second node and to cause the DC bus bars short circuited in response to a change in the received voltage difference being greater than a predetermined threshold.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
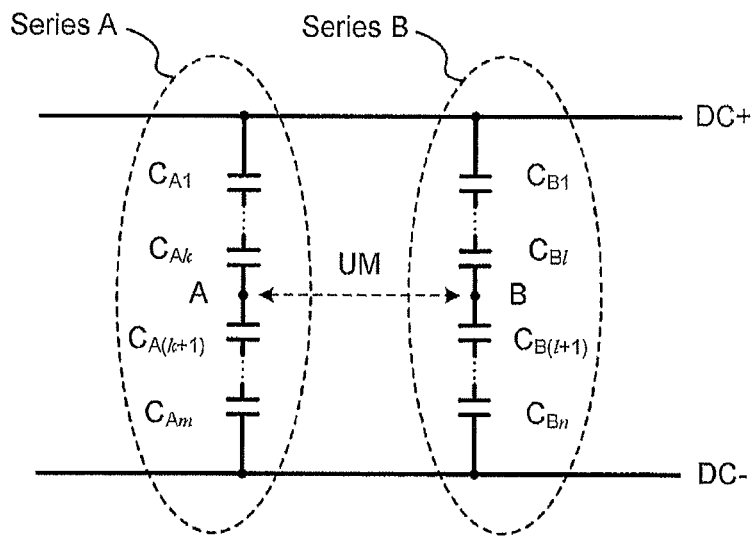
FIG. 1 schematically depicts a principle of monitoring a short-circuited state of a DC link capacitor according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

FIG. 1 schematically depicts a principle of monitoring a short-circuited state of a DC link capacitor according to certain embodiments of the present disclosure.

In FIG. 1, DC bus bars, DC+ and DC−, are shown. Those DC bus bars are configured to deliver a DC signal (either a voltage or a current) and/or DC power. For example, the DC bus bars connect a rectifier to an inverter. DC link capacitors are connected between the DC bus bars, in order to, for example, maintain the DC voltage across the DC bus bars substantially constant. Those DC link capacitors can be electrolytic capacitors, but the present disclosure is not limited thereto.

There can be more than one series-connection of DC link capacitors connected in parallel between the DC bus bars. Two of them, Series A and Series B, are shown in FIG. 1. In each of the series, there are several capacitors connected in series. For example, Series A includes first to m-th capacitors, $C_{A1}, \ldots, C_{Am}$, connected in series, and Series B includes first to n-th capacitors, $C_{B1}, \ldots, C_{Bn}$, connected in series. Here, m and n each are an integer greater than or equal to 2. In each of the series, the respective capacitors included therein may have the same capacitance as each other. For example, $C_{A1}=C_{A2}=\ldots=C_{Am}$, and/or $C_{B1}=C_{B2}=\ldots=C_{Bn}$. However, the present disclosure is not limited thereto. The capacitance of the respective capacitors can be adjusted as needed.

At least some of the series connected between the DC bus bars may have the same number of capacitors as each other. For example, m might be equal to n. Further, at least some of the series may have the same configuration as each other. For example, Series A and Series B have the same configuration, that is, m=n, and $C_{A1}:C_{A2}:\ldots:C_{Am}=C_{B1}:C_{B2}:\ldots:C_{Bn}$, and more specifically, $C_{A1}=C_{B1}$, $C_{A2}=C_{B2}, \ldots, C_{Am}=C_{Bn}$.

Each of the series has some node(s) between the respective capacitors included therein. For example, Series A has (m−1) nodes between the respective capacitors $C_{A1}, \ldots, C_{Am}$, one of which, node A between the capacitor $C_{Ak}$ and the capacitor $CA_{(k+1)}$ is specifically shown, where $1 \leq k < m$. Likewise, Series B has (n−1) nodes between the respective capacitors $C_{B1}, \ldots, C_{Bn}$, one of which, node B between the capacitor $C_{Bl}$ and the capacitor $C_{B(l+1)}$ is specifically shown, where $1 \leq l < n$. Hereinafter, node A and node B are considered, by way of example.

The inventors find that those nodes, for example, node A and node B, can be used as trigger-points in case of the capacitor(s) being short-circuited.

In a normal state, the voltage across the DC bus bars, DC+ and DC−, is applied across each of the series, and thus distributed across the respective capacitors included in this series according to their respective capacitance values. As a result, node A has a potential $V_A$ determined by its capacitance value together with capacitance values of the remaining capacitors in Series A, and node B has a potential $V_B$ determined by its capacitance value together with capacitance values of the remaining capacitors in Series B. Therefore, in the normal state, a voltage difference UM between node A and node B, $|V_A - V_B|$, is determined by the capacitance values of the DC link capacitors, and thus can be called a "default" voltage difference.

If one or more of the DC link capacitors are short-circuited, the voltage difference UM between node A and node B will change. Assume, for convenience of explanations, one or more of the capacitors included in Series B, $C_{B1}, \ldots, C_{Bn}$, are short-circuited. Due to the short-circuited capacitor(s), the potential at node B, $V_B$, will change, resulting in the voltage difference UM changed and thus departing from the default voltage difference. Therefore, it is possible to know whether any of the DC link capacitors is short-circuited or not by monitoring the voltage difference UM between node A and node B.

In certain embodiments, node A and node B may have substantially the same potential or voltage in the normal state. For example, this may be achieved by arranging Series A and Series B in the same configuration and selecting node A and node B at the same position in the respective Series. In this case, the voltage difference UM between node A and node B can be considered as the voltage change (because the default value difference is about 0).

The change in the voltage difference UM (or, the short-circuit of any capacitor) can be used to trigger safety measures, for example, burning of fuses. To do this, the DC bus bars, DC+ and DC−, can be shorted by a short-circuit module in response to the change in the voltage difference. There are various implementations for the short-circuit module, some of which will be described in detail in the following. For example, the short-circuit module can be configured to act if the change in the voltage difference is greater than a predetermined threshold. The short-circuit of the DC bus bars will speed up the burning of the fuses, and thus prevent the remaining capacitors from explosion and ground fault.

Figure 2:
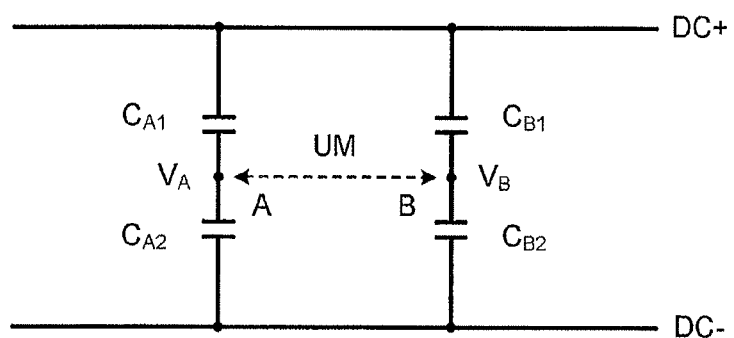
FIG. 2 schematically depicts a simplified arrangement of monitoring a short-circuited state of a DC link capacitor according to certain embodiments of the present disclosure.

FIG. 2 schematically depicts a simplified arrangement of monitoring a short-circuited state of a DC link capacitor according to certain embodiments of the present disclosure.

In FIG. 2, Series A is shown to have two capacitors, $C_{A1}$ and $C_{A2}$, and Series B is shown to also have two capacitors, $C_{B1}$ and $C_{B2}$. Midpoints A and B of the respective series are monitored. For simplification, midpoint A and midpoint B have substantially the same potential in the normal state. This is achieved by providing $C_{A1}:C_{A2}=C_{B1}:C_{B2}$, more specifically, $C_{A1}=C_{A2}$ and $C_{B1}=C_{B2}$, for example. It is also possible to provide $C_{A1}=C_{A2}=C_{B1}=C_{B2}$. In this case, midpoints A and B each withstand a half of the voltage across the DC bus bars (for example, about 700V). As a result, the default value for the voltage difference UM is about zero (0).

Assume, for convenience of explanations, $C_{B2}$ is short-circuited. The whole voltage across the DC bus bars, about 700V, is now applied to $C_{B1}$, probably cause explosion of $C_{B1}$. In this case, the voltage difference UM will change from about 0V to about 350V. This significant voltage change of about 350V can be used to trigger the short-circuit module. In this case, the trigger threshold may be set to a value between 0V and 350V, for example, about 100V.

Figure 3:
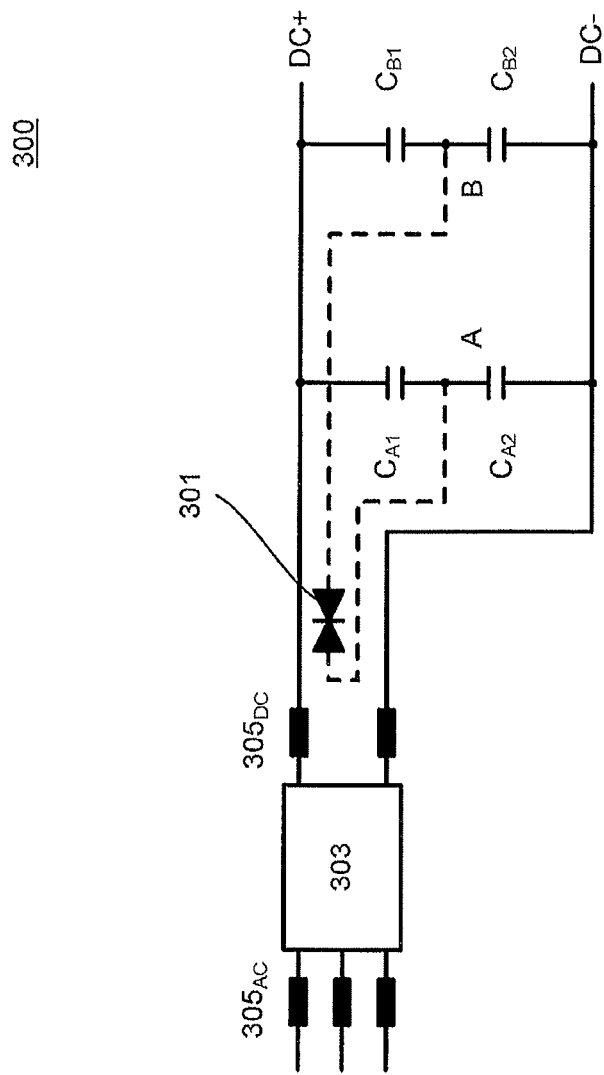
FIG. 3 schematically depicts a circuit design according to certain embodiments of the present disclosure.

FIG. 3 schematically depicts a circuit design according to certain embodiments of the present disclosure.

As shown in FIG. 3, the circuit 300 includes DC bus bars, DC+ and DC−, and also DC link capacitors connected between the DC bus bars. The DC link capacitors are arranged like in FIG. 2 for convenience of explanations, but the present disclosure is not limited thereto.

The circuit 300 further includes an arc-generating component 301, which is an example of the above described shirt-circuit module. The arc-generating component 301 is a component which can generate an electric arc in response to a voltage, for example, greater than its standoff voltage (corresponding to the trigger threshold, for example, about 100V). For example, the arc-generating component 301 can break down and remain short-circuited, and thus ignite the arc. The arc-generating component 301 may include at least one of a Transient Voltage Suppressor (TVS) diode, a Zener diode, a resistor, a varistor, an active component such as a semiconductor switch (transistors, for example), a SIDACtor, a fuse, a copper trace or wire, or any combination thereof, for example. For example, the arc-generating component 301 may include several TVS diodes connected in series to achieve the desired standoff voltage or trigger threshold.

The standoff voltage or trigger threshold can be selected appropriately. Specifically, the default value and all possible changed values (due to the short-circuit of any capacitors) for the voltage difference between node A and node B and thus differences between the default value and the various changed values are considered. The standoff voltage or trigger threshold can be determined based on the differences. More specifically, the standoff voltage or trigger threshold can be less than any of the differences, but still accommodates general fluctuation of the circuit.

In this example, the voltage difference between node A and node B is applied to the arc-generating component 301.

This voltage difference corresponds to the change in the voltage difference, as described above. If the voltage difference changes to about 350V due to, for example, the short-circuit of the capacitor $C_{B2}$, as described, the arc-generating component 301 will generate the arc due to the applied voltage 350V, which is greater than its standoff voltage of, for example, 100V.

The arc-generating component 301 is arranged adjacent to the DC bus bars, so that the generated arc can cause the DC bus bars short-circuited. More specifically, the arc-generating component 301 is arranged closely to the DC bus bars, for example, less than about 10 cm from each of the DC bus bars, so that the generated arc can establish an electric path between the DC bus bars. Further, the DC bus bars may have at least respective portion thereof arranged closely so that they can be short-circuited by the arc in a relatively easy way. The arrangement of the arc-generating component 301 with respect to the DC bus bars will be described in more detail in the following. The short-circuit of the DC bus bars can speed up burning of fuses, for example, those disposed in AC lines, $305_{AC}$, and/or those disposed in the DC bus bars, $305_{DC}$. Here, a component 303 is connected between the AC lines and the DC lines. The component 303 can handle AC/DC conversion, filtering, or the like. For example, the component 303 includes NFE. At least some of the fuses is burnt, and thus put this circuit 300 in a safe state, avoiding possible explosion of the remaining capacitors.

Figure 4:
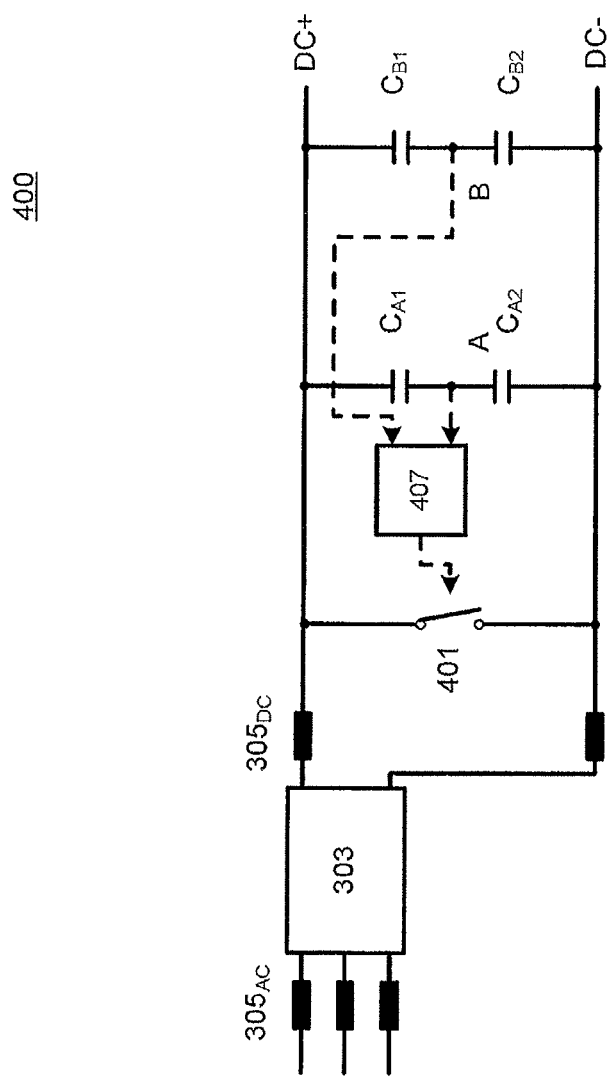
FIG. 4 schematically depicts another circuit design according to certain embodiments of the present disclosure.

FIG. 4 schematically depicts another circuit design according to certain embodiments of the present disclosure.

The circuit 400 shown in FIG. 4 is substantially same as the circuit 300 shown in FIG. 3, expect that a switch 401 is used instead of the arc-generating component 301.

The switch 401 is connected between the DC bus bars, and is controlled by a controller 407 to switch on/off. In the normal state, the switch 401 is in an open state.

In this example, the voltage difference between node A and node B is applied to the controller 407. This voltage difference corresponds to the change in the voltage difference, as described above. If the voltage difference changes to about 350V due to, for example, the short-circuit of the capacitor $C_{B2}$, as described, the controller 407 will generate a control signal to close the switch 401, in response to the applied voltage 350V, which is greater than a threshold voltage of the switch 401, for example, 100V. As a result, the bus bars, DC+ and DC−, are hard wired by the switch 401 and thus short-circuited. The switch 401 may include an electrical switch or a mechanical switch, for example.

In certain embodiments, the switch 401 may be configured to be switched off in response to loss of the applied voltage (or voltage difference). That is, the switch 401 can be reset automatically if there is no voltage applied thereto, because, for example, the fuses is burnt and thus the circuit is cut from power supply.

Figure 5:
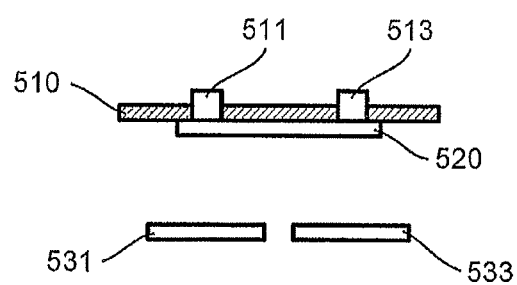
FIG. 5 schematically depicts an arrangement of short-circuiting DC bus bars according to certain embodiments of the present disclosure.

FIG. 5 schematically depicts an arrangement of short-circuiting DC bus bars according to certain embodiments of the present disclosure.

As shown in FIG. 5, a substrate 510 has an arc-generating component 520 disposed thereon. The substrate 510 may include a glass substrate, a plastic substrate, a ceramic substrate, a Printed Circuit Board (PCB), or the like. The arc-generating component 520 may be the above described arc-generating component 301, for example, a series-connection of TVS diodes. The arc-generating component 520 may be fixed onto the substrate 510 by solder, adhesive, mechanical fasteners, or the like. Two terminals 511 and 513 may be provided on the substrate 510. One of the two terminals 511 and 513 may be connected to node A, and the other of the two terminals 511 and 513 may be connected to node B. Further, the two terminals 511 and 513 are connected to respective terminals of the arc-generating component 520, so as to apply the voltage difference between node A and node B between the terminals. The connections between the terminals and/or the components can be galvanic connections.

A tab led from DC+ 531 and a tab led from DC− 533 are arranged closely to each other, and also closely to the arc-generating component 520. The arc-generating component 520 may be disposed between the tab 531 and the tab 533. In this example, the arc-generating component 520 is disposed to face both the tab 531 and the tab 533. In such an arrangement, there tends to be a short-circuit path between the tab 531 and the tab 533 if the arc-generating component 520 ignites arc.

In a further aspect, the present disclosure is related to a device including the above described circuit. For example, the device can be a frequency converter, a, motor drive, or the like.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An electronic circuit, comprising:
a first series-connection of DC link capacitors ($C_{A1}, \ldots, C_{Am}$) and a second series-connection of DC link capacitors ($C_{B1}, \ldots, C_{Bn}$) connected in parallel between DC bus bars (DC+, DC−),
wherein the first series has a first node (A) between the DC link capacitors thereof and the second series has a second node (B) between the DC link capacitors thereof;
wherein the electronic circuit further comprises a short-circuit module configured to receive a voltage difference (UM) between the first node and the second node and to cause the DC bus bars short circuited in response to a change in the received voltage difference being greater than a predetermined threshold; and
wherein the short-circuit module comprises an arc-generating component, which is arranged in a distance of less than 10 cm from the DC bus bars and operable to generate an electric arc in response to the change in the received voltage difference being greater than the predetermined threshold.

2. The electronic circuit of claim 1, wherein the first node (A) and the second node (B) have substantially the same voltage in a normal state of the DC link capacitors.

3. The electronic circuit of claim 2, further comprising fuses connected in the DC bus bars (DC+, DC−) and configured to be burnt when the DC bus bars are short circuited.

4. The electronic circuit of claim 1, wherein the arc-generating component is operable to blow up when the change in the received voltage difference is greater than the predetermined threshold.

5. The electronic circuit of claim 1, wherein the arc-generating component comprises at least one of a Transient Voltage Suppressor (TVS) diode, a Zener diode, a resistor, a varistor, an active component, a SIDACtor, a fuse, a copper trace or wire, or any combination thereof.

6. The electronic circuit of claim 5, wherein the active component comprises a semiconductor switch.

7. The electronic circuit of claim 1, wherein at least portions of the respective DC bus bars (DC+, DC−) are arranged to be close to each other and the arc-generating component is arranged between the respective portions of the DC bus bars.

8. The electronic circuit of claim 7, wherein the respective portions of the DC bus bars comprise electrode tabs led from the respective DC bus bars.

9. The electronic circuit of claim 1, further comprising fuses connected in the DC bus bars (DC+, DC−) and configured to be burnt when the DC bus bars are short circuited.

10. The electronic circuit of claim 1, further comprising fuses connected in AC lines, from which a DC voltage is converted and then delivered on the DC bus bars, wherein the fuses are configured to be burnt when the DC bus bars are short circuited.

11. A device, comprising the electronic circuit of claim 1.

12. The electronic circuit of claim 4, wherein the arc-generating component comprises at least one of a Transient Voltage Suppressor (TVS) diode, a Zener diode, a resistor, a varistor, an active component, a SIDACtor, a fuse, a copper trace or wire, or any combination thereof.

13. A method of operating an electronic circuit, the electronic circuit comprising a first series-connection of DC link capacitors ($C_{A1}, \ldots, C_{Am}$) and a second series-connection of DC link capacitors ($C_{B1}, \ldots, C_{Bn}$) connected in parallel between DC bus bars (DC+, DC−), characterized in that wherein the method comprises:

monitoring a voltage difference between a first node (A) between the DC link capacitors ($C_{A1}, \ldots, C_{Am}$) of the first series and a second node (B) between the DC link capacitors ($C_{B1}, \ldots, C_{Bn}$) of the second series, wherein the first node (A) and the second node (B) are selected so that they have substantially the same voltage in a normal state of the DC link capacitors; and short-circuiting the DC bus bars in response to the monitored voltage difference being greater than a predetermined threshold;

wherein the short-circuiting comprises generating an electric arc by an arc-generating component being arranged in a distance of less than 10 cm from the DC bus bars.

14. A frequency converter, comprising:

DC bus bars (DC+, DC−) configured to deliver DC power;

a first series-connection of DC link capacitors ($C_{A1}, \ldots, C_{Am}$) and a second series-connection of DC link capacitors ($C_{B1}, \ldots, C_{Bn}$) connected in parallel between DC bus bars (DC+, DC−), wherein the first series has a first node (A) between the DC link capacitors thereof and the second series has a second node (B) between the DC link capacitors thereof, wherein the first node (A) and the second node (B) have substantially the same voltage in a normal state of the DC link capacitors; and that the frequency converter further comprises a short-circuit module configured to receive a voltage difference (UM) between the first node and the second node and to cause the DC bus bars short circuited in response to a change in the received voltage difference being greater than a predetermined threshold;

wherein the short-circuit module comprises an arc-generating component, which is arranged in a distance of less than 10 cm from the DC bus bars and operable to generate an electric arc in response to the change in the received voltage difference being greater than the predetermined threshold.

* * * * *